US009665512B2

(12) United States Patent
Garcia-Arellano et al.

(10) Patent No.: US 9,665,512 B2
(45) Date of Patent: May 30, 2017

(54) MEMORY MANAGEMENT IN PRESENCE OF ASYMMETRICAL MEMORY TRANSFER COST

(71) Applicant: International Business Machines Corporation, Armonk, NY (US)

(72) Inventors: Christian M. Garcia-Arellano, Richmond Hill (CA); Adam J. Storm, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 14/933,050

(22) Filed: Nov. 5, 2015

(65) Prior Publication Data

US 2016/0188247 A1    Jun. 30, 2016

(30) Foreign Application Priority Data

Dec. 29, 2014 (CA) .................................. 2876379

(51) Int. Cl.
*G06F 12/02* (2006.01)
*G06F 13/28* (2006.01)
(Continued)

(52) U.S. Cl.
CPC .............. *G06F 13/28* (2013.01); *G06F 12/02* (2013.01); *G06F 12/023* (2013.01); *G06F 3/0631* (2013.01); *G06F 9/50* (2013.01)

(58) Field of Classification Search
CPC ...... G06F 12/02; G06F 12/023; G06F 3/0631; G06F 9/50; G06F 13/28
(Continued)

(56) References Cited

U.S. PATENT DOCUMENTS 7,694,102 B2    4/2010  Garcia-Arellano
7,783,852 B2    8/2010  Lahiri et al.
(Continued)

OTHER PUBLICATIONS

Rodd et al., "Adaptive self-tuning techniques for performance tuning of Database systems : A Fuzzy-based approach", 2013 Second International Conference on Advanced Computing, Networking and Security, IEEE Computer Society, DOI 10.1109/ADCONS.2013.49, © 2013 IEEE, pp. 124-129.
(Continued)

*Primary Examiner* — Than Nguyen
(74) *Attorney, Agent, or Firm* — Steven F. McDaniel; Pooya Shoghi Ghalehshahi

(57) ABSTRACT

A computer-implemented method includes assigning a threshold value to a memory consumer and assigning a bias value to the threshold value. The ability to free memory of the consumer by the consumer is monitored. In response to a determination to reclaim the memory, the consumer is directed to reclaim the memory. The threshold value is transformed responsive to whether the reclaiming exhibits at least one of time-out or completion of reclaim after a predetermined time. Per memory consumer control values are updated and the memory is logically partitioned according to a defined ratio into at least a first portion and a second portion. Subsequent to directing the consumer to reclaim the memory, the memory is reclaimed from the second portion and, subsequently, the second portion is replenished from the first portion in a manner that maintains the defined ratio. A corresponding computer system and computer program product are also disclosed.

20 Claims, 9 Drawing Sheets

(51) Int. Cl.
*G06F 9/50* (2006.01)
*G06F 3/06* (2006.01)

(58) Field of Classification Search
USPC .......................................... 711/170, 171, 173
See application file for complete search history.

(56) References Cited

U.S. PATENT DOCUMENTS

| | | |
|---|---|---|
| 8,122,450 B2 | 2/2012 | Diao et al. |
| 8,539,186 B2 | 9/2013 | Sechrest et al. |
| 2005/0091654 A1* | 4/2005 | Lection ................. G06F 9/5005 718/100 |
| 2005/0240641 A1* | 10/2005 | Kimura ............... G06F 12/0253 707/999.206 |
| 2005/0268063 A1* | 12/2005 | Diao .................... G06F 9/5083 711/170 |
| 2008/0126736 A1* | 5/2008 | Heil .................... G06F 12/0253 711/171 |
| 2009/0055609 A1 | 2/2009 | Kuczynski et al. |
| 2015/0178010 A1* | 6/2015 | Chang .................... G06F 3/061 711/170 |
| 2015/0347295 A1* | 12/2015 | Ihm .................... G06F 12/0253 711/103 |
| 2015/0363236 A1* | 12/2015 | Manpathak ........... G06F 9/5016 711/160 |
| 2016/0147648 A1* | 5/2016 | Niu ....................... G06F 12/023 711/149 |

OTHER PUBLICATIONS

"Memory Management in Presence of Asymetrical Memory Transfer Costs", Canada Patent Application No. 2876379, filed on Dec. 29, 2014, 44 pages.

\* cited by examiner

MEMORY MANAGEMENT IN PRESENCE OF ASYMMETRICAL MEMORY TRANSFER COST

BACKGROUND

The disclosure relates generally to memory management in data processing systems and more specifically to tuning of memory usage in those systems.

In data processing systems, asymmetrical costs of memory transfer between memory consumers can distort effective memory management. Developers and consumers of those systems continue to face challenges in maintaining effective memory management in data processing systems. Such challenges can affect speed, scale, and reliability of computing environments.

SUMMARY

A computer-implemented method includes assigning a threshold value asynchronously, by a memory tuner, to a memory consumer; assigning a bias value to the threshold value, by the memory tuner; monitoring, by the memory tuner, an ability to free memory by the memory consumer; and determining, by the memory tuner, whether to reclaim memory of the memory consumer. The computer-implemented method further includes, in response to a determination to reclaim memory of the memory consumer, directing, by the memory tuner, the memory consumer to reclaim the memory of the memory consumer; and determining whether, when reclaiming the memory of the memory consumer, the memory consumer exhibits at least one of a time out or a completion of the reclaim after a first predetermined amount of time.

The computer-implemented method further includes, in response to a determination that, when reclaiming the memory of the memory consumer, the memory consumer exhibits at least one of a time out or a completion of the reclaim after the first predetermined amount of time, transforming, by the memory tuner, the threshold value by a first predetermined adjustment factor; and in response to a determination that, when reclaiming the memory of the memory consumer, the memory consumer does not exhibit at least one of a time out or a completion of the reclaim after the first predetermined amount of time, transforming, by the memory tuner, the threshold value by a second predetermined adjustment factor.

The computer-implemented method further includes updating per memory consumer control values, by the memory tuner; and logically partitioning the memory of the memory consumer, by the memory tuner, according to both an ability of the memory consumer to free the memory and a defined ratio that divides the memory used by the memory consumer into at least a first portion and a second portion.

The computer-implemented method further includes, subsequent to directing, by the memory tuner, the memory consumer to reclaim the memory of the memory consumer, reclaiming, by the memory consumer, memory from the second portion; and subsequent to reclaiming, by the memory consumer, memory from the second portion, replenishing, by the memory consumer, the second portion of the memory freed by the memory consumer asynchronously from the first portion in a manner that maintains the defined ratio. A corresponding computer system and computer program product are also disclosed.

DETAILED DESCRIPTION

Figure 1:
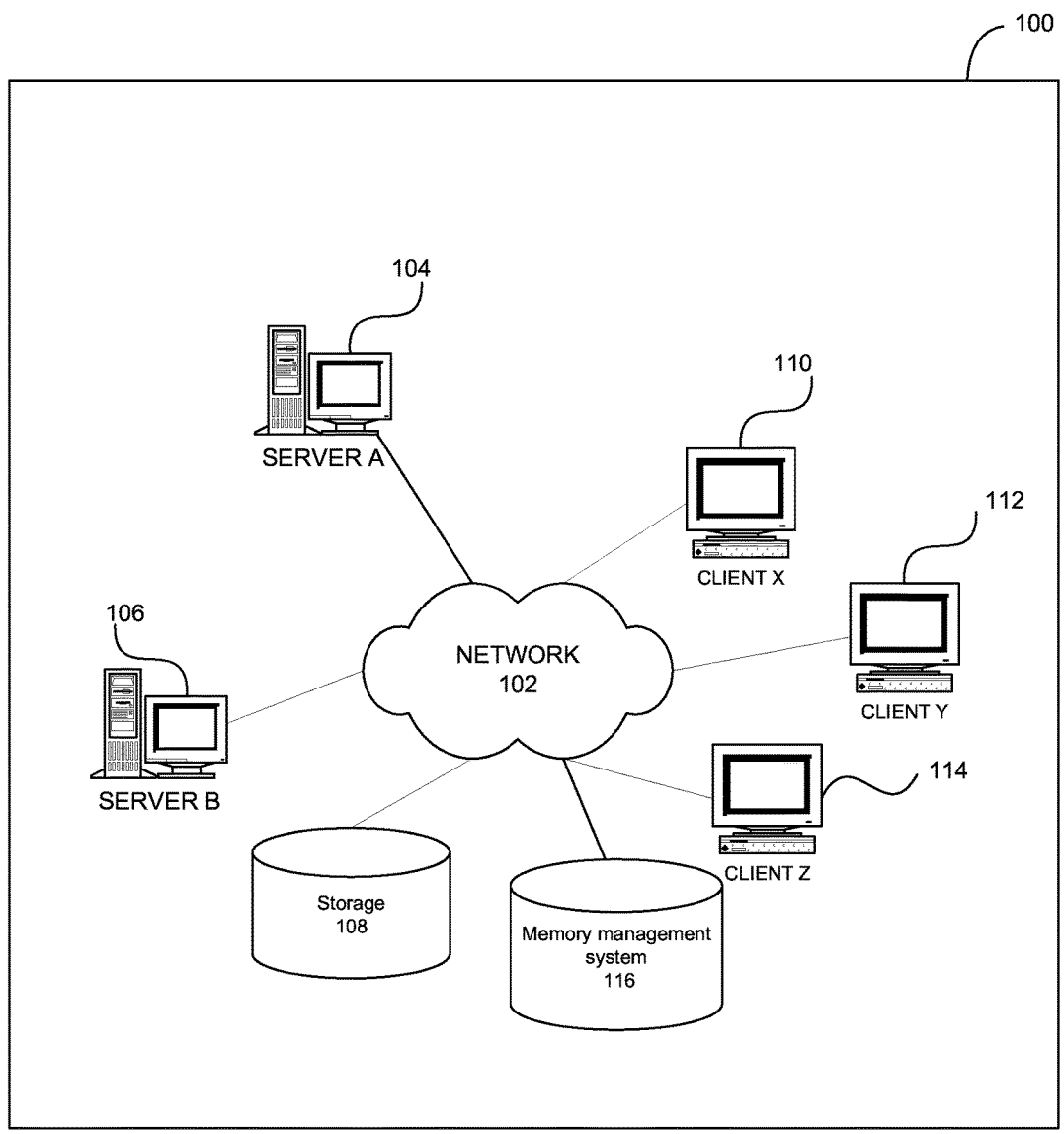
FIG. 1 is a pictorial representation of a network data processing system suitable for operating a dynamic memory tuning program, in accordance with at least one embodiment of the present invention.

Modern automatic memory tuning systems typically calculate a cost-benefit metric for each memory consumer being tuned, and then trade memory from the consumers with low benefit (and low cost) to those consumers with high benefit. Implicit in these systems however, is an assumption that the cost, in terms of processing resources, of transferring memory between consumers is symmetrical; that is, the resources required to transfer memory from consumer A to consumer B is the same as the resources required to transfer memory from consumer B to consumer A. In typical systems, however this assumption is not true. In at least some embodiments, a memory consumer is any computer program (and/or any set of one or more computer programs grouped together for memory allocation and/or memory management purposes) that uses one or more computer readable storage media.

For example, when the system allocates memory to a buffer manager managing a portion of memory, known as a "buffer pool" in database terminology, there is only a requirement to properly format the pages and add the formatted pages to the free page list. However when the memory is to be removed from the same buffer pool, the resources required is more significant than performing the allocation operation. First a set of contiguous pages to be freed is identified. Then, when dirty pages (pages newer in memory than copies on disk) are stored in the memory, these pages must be written to disk. Finally, buffer manager control structures are updated to indicate the memory being removed is no longer accessible. At this point the memory is available for allocation to another memory consumer.

Memory that cannot be reclaimed from a memory consumer as quickly (or as easily) as the memory can be given to the memory consumer presents significant challenges to memory managers. A typical problem associated with the asynchronous nature of memory consumers leads to situations where a given memory consumer becomes a memory "sink," in which memory typically can enter but not exit. The result is a memory system which exhibits degraded performance as less and less free memory becomes available. The problem is typically amplified in situations in which the memory of the system is constrained, and memory must be freed to avoid out-of-memory situations. When the memory is not easily releasable by memory consumers, at these critical points in time, system performance can suffer, and in extreme cases, those circumstances may cause the system to fail.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied in which the present invention may be a system, a method, and/or a computer program product. The computer program product may include a computer readable storage medium (or more than computer readable storage media) having computer readable program instructions thereon for causing a processor to carry out aspects of the present invention.

The computer readable storage medium can be a tangible device that can retain and store instructions for use by an instruction execution device. The computer readable storage medium may be an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
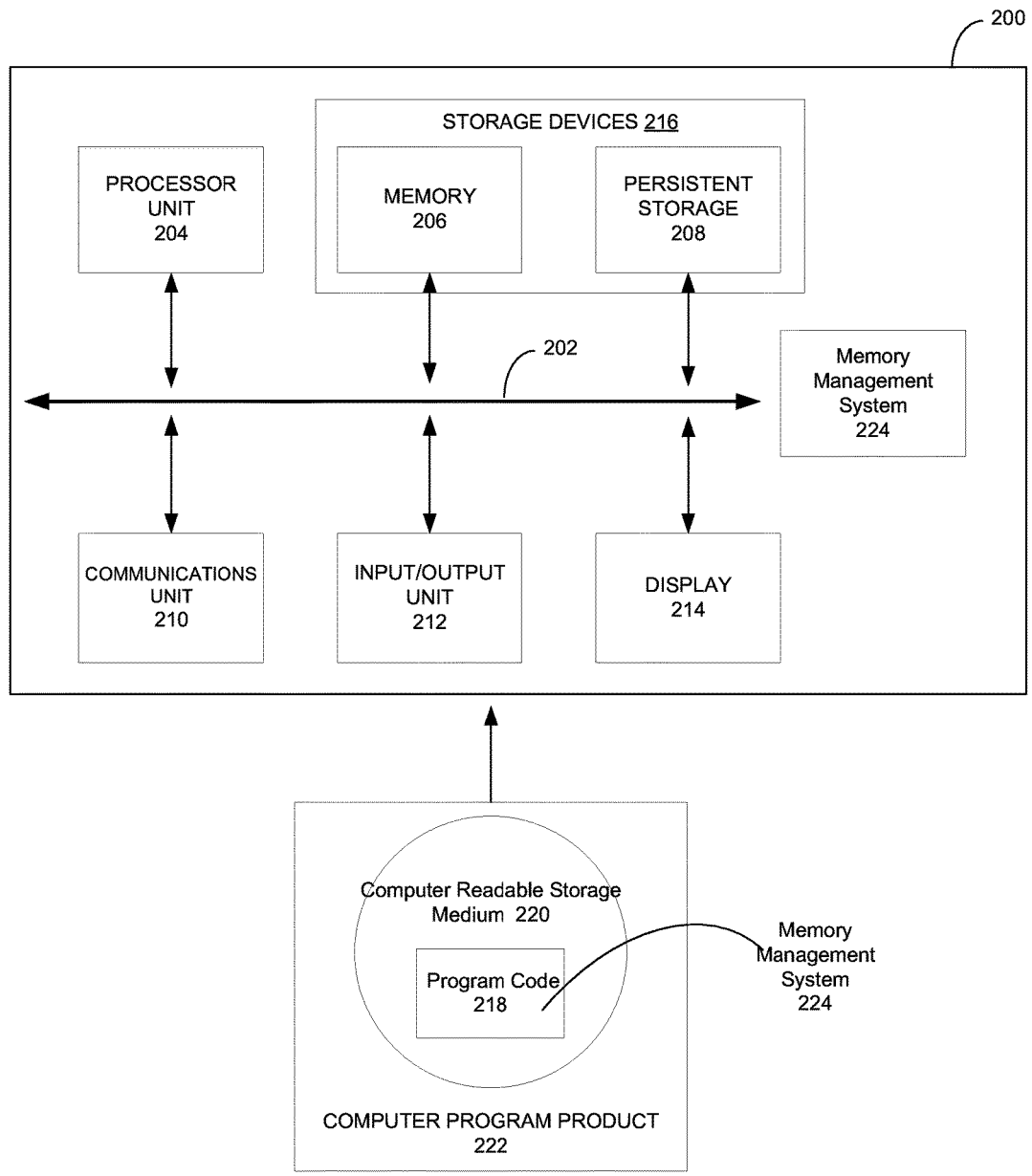
FIG. 2 is a block diagram of a data processing system suitable for operating a dynamic memory tuning program, in accordance with at least one embodiment of the present invention.

With reference now to the figures and in particular with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 is a pictorial representation of a network data processing system suitable for operating a dynamic memory tuning program, in accordance with at least one embodiment of the present invention. Network data processing system 100 is a network of computers in which at least some embodiments of the present invention may be implemented. Network data processing system 100 includes network 102, which is the medium used to provide communication links between various devices and computers connected together within the network data processing system 100. Network 102 may include connections, such as wire, wireless communication links, or fiber optic cables.

In the network data processing system 100 depicted in FIG. 1, server A 104 and server B 106 connect to the network 102 along with a storage unit 108. In addition, client X 110, client Y 112, and client Z 114 connect to the network 102. Client X 110, client Y 112, and client Z 114 may be, for example, personal computers or network computers. In the example depicted in FIG. 1, server A 104 provides data, such as boot files, operating system images, and applications to client X 110, client Y 112, and client Z 114. Client X 110, client Y 112, and client Z 114 are clients to server A 104 in this example. Network data processing system 100 may include additional servers, clients, and other devices not shown.

In the network data processing system 100 depicted in FIG. 1, memory management system 116 is an enhanced memory manager, shown as accessible through network 102 for downloading onto one or more of server A 104, server B 106, and clients X 110, Y 112, and Z 114 for use in the respective device. Memory management system 116 typically executes on the system on which it is used to manage the memory usage of memory consumers of the respective system. An embodiment of memory management system 116 provides additional capabilities which complement functions of a typical memory management system, which will be described in further detail on forthcoming sections.

In the network data processing system 100 depicted in FIG. 1, network data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 2 is intended as an example, and not as an architectural limitation for the different illustrative embodiments.

FIG. 2 is a block diagram of a data processing system 200 suitable for operating a dynamic memory tuning program, in accordance with at least one embodiment of the present invention. In the data processing system 200 depicted in FIG. 2, the data processing system 200 includes communications fabric 202, which provides communications between processor unit 204, memory 206, persistent storage 208, communications unit 210, input/output (I/O) unit 212, display 214 and memory management system 224, which is an example of memory management system 116 of FIG. 1 which, when executed by processor unit 204, provides a capability of managing memory 206.

In the data processing system 200 depicted in FIG. 2, processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In the data processing system 200 depicted in FIG. 2, memory 206 and persistent storage 208 are examples of storage devices 216. A storage device is any piece of hardware that is capable of storing information (such as, for example without limitation, data, program code in functional form, and/or other suitable information) either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

In the data processing system 200 depicted in FIG. 2, communications unit 210 provides for communications with other data processing systems or devices. In these examples, communications unit 210 is a network interface card. Communications unit 210 may provide communications through the use of either or both physical and wireless communications links.

In the data processing system 200 depicted in FIG. 2, input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

In the data processing system 200 depicted in FIG. 2, instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

In the data processing system 200 depicted in FIG. 2, instructions for the operating system, applications and/or programs are referred to as program code, computer usable program code, or computer readable program code that may be read and executed by a processor in processor unit 204. The program code in the different embodiments may be embodied on different physical or tangible computer readable storage media, such as memory 206 or persistent storage 208.

In the data processing system 200 depicted in FIG. 2, program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples including code for memory management system 224. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage device, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable.

In the data processing system 200 depicted in FIG. 2, program code 218 may alternatively be transferred to data processing system 200 from computer readable storage media 220 through a communications link to communications unit 210 and/or through a connection to input/output unit 212. The communications link and/or the connection may be physical or wireless in the illustrative examples.

In some embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

The data processing system 200 depicted in FIG. 2 may be used to operate a dynamic memory tuning program. In at least some embodiments, the dynamic memory tuning program is a computer-implemented process for tuning memory in presence of asymmetrical memory transfer costs. In at least some embodiments, processor unit 204 executes computer executable program code to direct the apparatus of the data processing system 200 to assign a threshold value asynchronously, by a memory tuner, to a memory consumer; assign a bias value to the threshold value, by the memory tuner; and monitor, by the memory tuner, an ability to free memory by the memory consumer.

In at least some embodiments, processor unit 204 executes the computer executable program code to further direct the apparatus to determine, by the memory tuner, whether to reclaim memory of the memory consumer and, in response to a determination to reclaim memory of the memory consumer, direct, by the memory tuner, the memory consumer to reclaim the memory. In at least some embodiments, the processor unit executes the computer executable program code to further direct the apparatus to determine whether, when reclaiming the memory of the memory consumer, the memory consumer exhibits at least one of a time out or a completion of the reclaim after a first predetermined amount of time (e.g. 2 seconds); in response to a determination that, when reclaiming the memory of the memory consumer, the memory consumer exhibits at least one of a time out or a completion of the reclaim after the first predetermined amount of time, transform (i.e. multiply or divide), by the memory tuner, the biased threshold value by a first predetermined adjustment factor; and in response to a determination that, when reclaiming the memory of the memory consumer, the memory consumer does not exhibit at least one of a time out or a completion of the reclaim after the first predetermined amount of time, transform, by the memory tuner, the biased threshold value by a second predetermined adjustment factor.

In at least some embodiments, processor unit 204 executes the computer executable program code to further direct the apparatus to update per memory consumer control values, by the memory tuner; and logically partition the memory of the memory consumer, by the memory tuner, according to both an ability of the memory consumer to free the memory and a defined ratio that divides the memory used by the memory consumer into at least a first portion and a second portion. In at least some embodiments, processor unit 204 executes the computer executable program code to further determine whether the memory tuner directs the memory consumer to reclaim memory from the memory consumer; in response to the memory tuner directing the memory consumer to reclaim memory from the memory consumer, reclaim, by the memory consumer, memory from the second portion; and subsequent to reclaiming, by the memory consumer, memory from the second portion, replenish, by the memory consumer, the second portion of the memory freed by the memory consumer asynchronously from the first portion in a manner that maintains the defined ratio.

Figure 3:
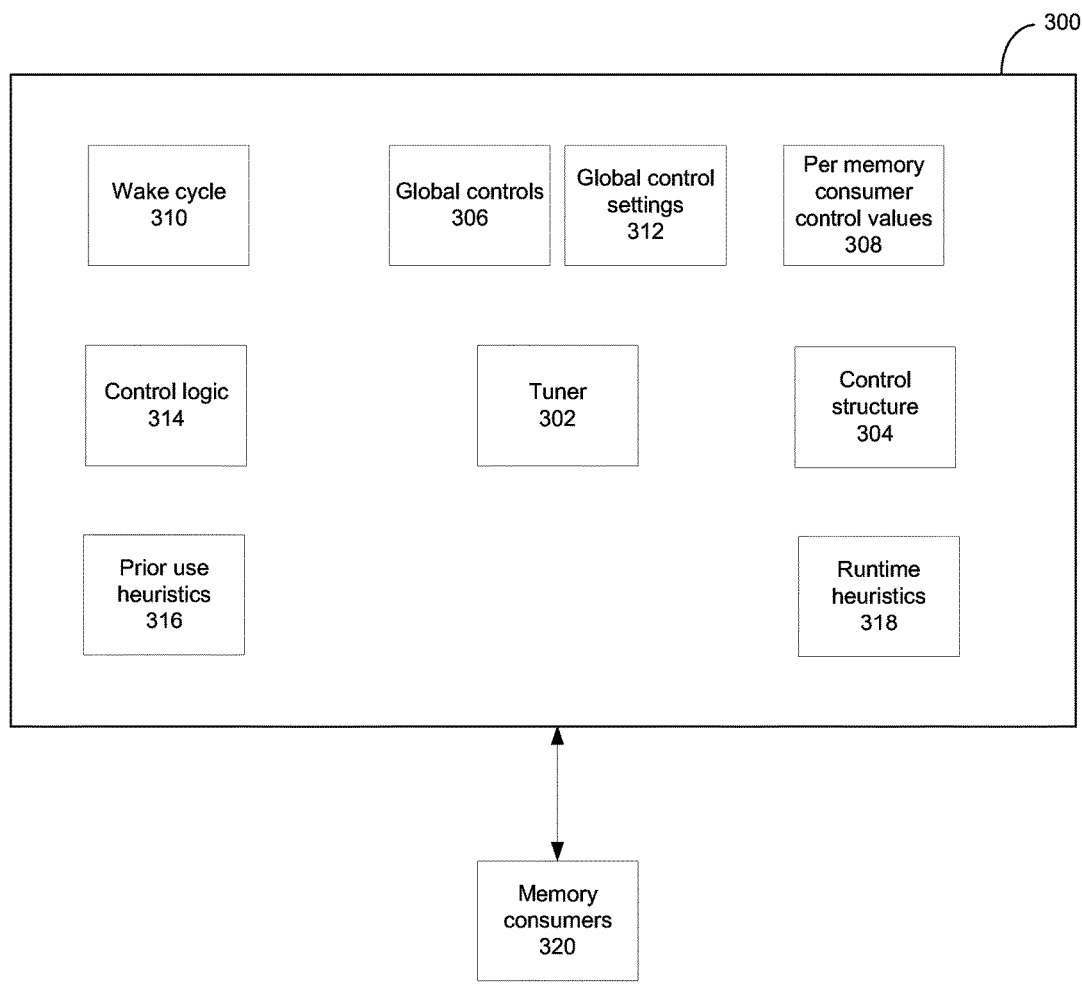
FIG. 3 is a block diagram of a memory management system suitable for operating a dynamic memory tuning program, in accordance with at least one embodiment of the present invention.

FIG. 3 is a block diagram of a memory management system 300 suitable for operating a dynamic memory tuning program, in accordance with at least one embodiment of the present invention. Memory management system 300 is an example of memory management system 116 of FIG. 1 and provides memory management services to control memory utilization associated with a plurality of memory consumers 320. Memory management system 300 includes a set of components comprising tuner 302, control structure 304, global controls 306, per user control values 308, wakeup cycle 310, global control settings 312, control logic 314, prior use heuristics 316, and runtime heuristics 318. These components may be provisioned in hardware, software or a combination thereof as discrete components or in some combination of components as needed for a particular implementation.

In the memory management system 300 depicted in FIG. 3, tuner 302 provides a functional capability of managing reclamation of memory from one or more of memory consumers 320. Memory is reclaimed from memory consumers 320 when memory management system 300 requires free memory to resolve allocation requests from one or more of memory consumers 320 for additional memory. Tuner 302 uses the components described below to cause one or more of memory consumers 320 to free memory, according to a cost benefit determination to satisfy requests for memory, thereby typically reducing performance impacts due to out of memory situations as well as possibly avoiding a system outage.

Figure 4:
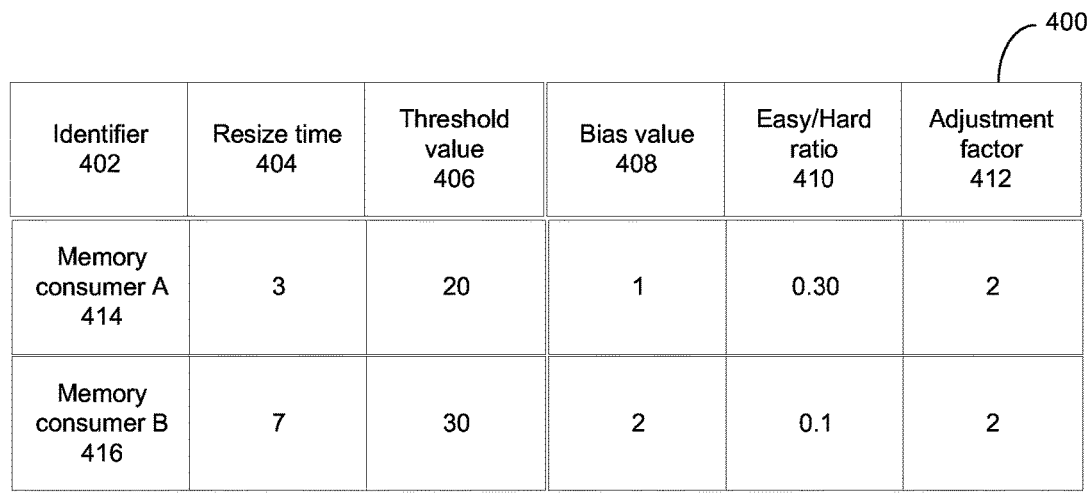
FIG. 4 is a block diagram of a control structure of a memory management system suitable for operating a dynamic memory tuning program, in accordance with at least one embodiment of the present invention.

In the memory management system 300 depicted in FIG. 3, control structure 304 represents set of parameters and associated values used by tuner 302 to compute an action to take in managing memory reclamation from one or more of memory consumers 320. In an illustrative example, a control structure in the form of a table, such as the table 400 shown in FIG. 4, is used to capture and maintain values used in memory management calculations using respective parameters in the set of parameters.

In the memory management system 300 depicted in FIG. 3, global control values 306 contain a set of values used across a plurality of memory consumers in the management of memory allocations for the plurality of memory consumers. Global control values 306 comprise global control settings specifying particular values used to identify a memory growth value which specifies an upper limit for increased memory as a percentage of allocated memory and a memory decline value which specifies an upper limit for a reduction in previously allocated memory as a percentage of allocated memory. The memory decline value controls how much memory can be reclaimed during a resizing activity while the memory growth value controls how much memory can be added during the resizing activity.

In the memory management system 300 depicted in FIG. 3, per user control values 308 comprises a set of corresponding values for a set of attributes associated with each memory consumer of the plurality of memory consumers. Per user control values 308 are maintained on a per user basis in control structure 304 and may be updated, as required, during runtime per control logic 314. Prior use heuristics 316 and/or runtime heuristics 318 are used to populate the values of per user control values 308. Per user control values 308 are shown in the example of control structure 304 depicted in FIG. 4.

In the memory management system 300 depicted in FIG. 3, wakeup cycle 310 provides a capability to manage the period in which tuner 302 executes control logic 314 to manage reclamation of memory from one or more of memory consumers 320. For example, tuner 302 need not be executing on a continual basis and using system resources when periodic maintenance will suffice. Wakeup cycle 310 comprises a configurable value identifying a time duration in which tuner 302 is to not execute and after which tuner 302 is to wake and perform defined operations.

In the memory management system 300 depicted in FIG. 3, control logic 314 provides a set of operation capabilities in the form of programmable logic implemented as a set of code representative of a programming language. Control logic 314 further comprises condition operations or tests, which are used to determine whether an action associated with a particular condition should be executed. The conditional operations and associated actions may be expressed as one or more rules, which when fired during execution of tuner 302 cause tuner 302 to effect a change in one or more memory consumers and/or per memory consumer control values, heuristics and memory allocation of a respective memory consumer.

In the memory management system 300 depicted in FIG. 3, heuristics are maintained as a result of operation of tuner 302 in the form of either prior use heuristics 316 and runtime heuristics 318. Prior use heuristics 316 is a stored collection of values representative of activity associated with one or more memory consumers in the form of per memory consumer control values. Prior use heuristics 316 may be analyzed to provide an indication of performance of a particular memory consumer with respect to freeing previously allocated memory when requested.

In the memory management system 300 depicted in FIG. 3, runtime heuristics 318 is a collection of values representative of activity associated with one or more memory consumers in the form of per memory consumer control values obtained during recent monitoring and collecting operation. Runtime heuristics 318 may therefore be viewed as dynamic in nature rather than prior use heuristics 316, which represent static values.

FIG. 4 is a block diagram of a control structure 400 of a memory management system suitable for operating a dynamic memory tuning program, in accordance with at least one embodiment of the present invention. Table 400 is an example of an embodiment of control structure 304 of FIG. 3. A header row table 400 lists Identifier 402, Resize time 404, Threshold value 406, Bias value 408, Easy/hard ratio 410 and Adjustment factor 412. Two following rows identify particular values corresponding to the parameters list in the header row for memory consumer A 414 in a first row and memory consumer B 416 in a second row. Identifier 402 is a unique identifier associated with a respective memory consumer. The identifier may be a system generated identifier, such as a thread identifier or a long running task as in a subsystem or system executing within a system on which memory management system 300 operates and for which tuner 302 is responsible to man.

In the control structure 400 depicted in FIG. 4, resize time 404 provides a value representative of a time taken by a respective memory consumer to perform a free memory operation in response to a request from tuner 302 of FIG. 3. Resize time 404 may then be used as a metric against which future free memory operations associated with a respective memory consumer are performed. The time value is identified in a form of system units, typically a number of milliseconds.

In the control structure 400 depicted in FIG. 4, threshold value 406 is a computed value representative of a cost benefit analysis of moving memory from a respective memory consumer for use by another memory consumer. The value computed is indicative of a point on a cost benefit curve relating how costs of a simple act of moving memory offset a nominal benefit a given consumer obtains for obtaining the memory. The point is a threshold after which no further memory growth is justified.

In the control structure 400 depicted in FIG. 4, bias value 408 is a predetermined value associated with an ability of a particular memory consumer to free memory upon request. The bias value may be used to smooth differences in systems, platforms and implementations. The higher the bias value the more the memory consumer is noted to have a difficulty to free memory upon request.

In the control structure 400 depicted in FIG. 4, easy/hard ratio 410 is a value determined based on the size a first portion of memory allocated to a respective memory consumer identified as being hard to free upon request compared with the size of a second portion of memory allocated to a respective memory consumer identified as being easy to free upon request. One or more number of pages or blocks of memory allocated to a respective memory consumer is known to be easier to free than one or more number of pages or blocks of the same memory allocation. For example a thread may have a set of control blocks, a set of working storage pages and a set of unused pages all within a group of pages previously allocated to the thread. Freeing memory in response to a request becomes relatively easier as the order progresses from the set of control blocks, to the set of working storage pages and to the set of unused pages. Therefore the "easy" portion would definitely include the set of unused pages while the "hard" portion would definitely include the set of control blocks. In this example, the set of working storage pages would typically be included in the "easy" portion. In some embodiments, easy/hard ratio 410 is expressed as a percentage of the size of the easy portion divided by the size of the hard portion. The size may be expressed in units of pages, blocks or other units allocated and freed per the implementation.

In the control structure 400 depicted in FIG. 4, adjustment factor 412 provides another value to alter the result of a biased threshold value. Adjustment factor 412 is a predetermined value for a respective memory consumer indicating a runtime refinement resulting from observed behavior of the respective memory consumer responding to a free memory request. In an illustrative embodiment, a value, such as 1, indicates the memory consumer has respond to a free memory request in accordance with expected times. A lower value, such as 0.5 indicates the memory consumer has responded to a free memory request with better than expected times. A higher value, such as 2 indicates the memory consumer has responded to a free memory request with longer than expected times. Adjustment factor 412 is therefore used as a multiplier to alter a previously calculated biased threshold value.

In the control structure 400 depicted in FIG. 4, entries for memory consumer A 414 include a respective identifier of memory consumer A 414, a resize time of 3 (milliseconds in this example), a threshold value of 20 (represents a calculated cost benefit of reclaiming pages using the respective memory consumer), a bias value of 1, indicating a presumed relatively easy freeing of memory, an easy/hard ratio of 0.30 indicating the easy portion of the memory allocated to the respective memory consumer is 30 percent of the hard portion of the memory allocated to the respective memory consumer and an adjustment factor of 2 indicating the memory consumer has responded to a free memory request with longer than expected times. In a similar manner entries for memory consumer B 416 include a respective identifier of memory consumer B 416, a resize time of 3 (milliseconds in this example), a threshold value of 20, a bias value of 1, an easy/hard ratio of 0.30 and an adjustment factor of 2.

Figure 5:
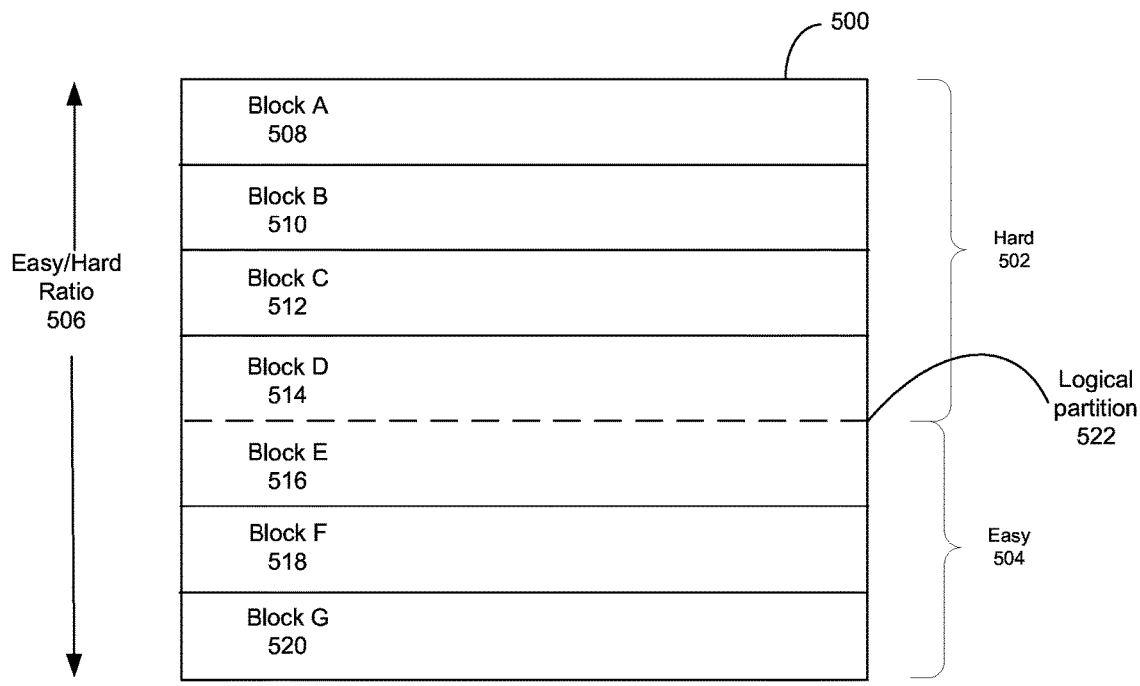
FIG. 5 is a block diagram of a memory structure of a memory management system suitable for operating a dynamic memory tuning program, in accordance with at least one embodiment of the present invention.

FIG. 5 is a block diagram of a memory structure of a memory management system (such as the memory management system 300 depicted in FIG. 3) suitable for operating a dynamic memory tuning program, in accordance with at least one embodiment of the present invention. In the memory structure depicted in FIG. 5, memory block 500 is an example of an allocation of memory to a memory consumer managed by memory management system 300 and tuner 302 of FIG. 3. The portion designated as "Hard" 502 is representative of a set of blocks within memory comprising Block A 508 through Block D 514 (i.e. Block A 508, Block B 510, Block C 512, and Block D 514). The blocks within this set of blocks are deemed to be hard to reclaim or free upon a request from tuner 302 and therefore would be moved after another alternative.

In the memory structure depicted in FIG. 5, the portion designated as "Easy" 504 is representative of a set of blocks within memory block 500 comprising Block E 516 through Block G 520 (i.e. Block E 516, Block F 518, and Block G 520). The blocks within this set of blocks are deemed to be easy to reclaim or free upon a request from tuner 302 and therefore would be moved sooner than another alternative, such as the blocks of portion 502. Blocks in the block segment from Block A 508 through Block G 520 represent a total allocation of blocks within memory block 500.

In the memory structure depicted in FIG. 5, easy/hard ratio 506 depicts a calculation involving size of portion 504 divided by size of portion 504. Logical partition 522 represents a boundary separating the set of blocks of portion 502 from the set of blocks of portion 504. The separation is not physical as in an internal use indicating blocks, which belong to either hard 502 or easy 504. Movement of blocks from hard 502 to easy 504 is discussed later with regard to FIG. 6.

Figure 6:
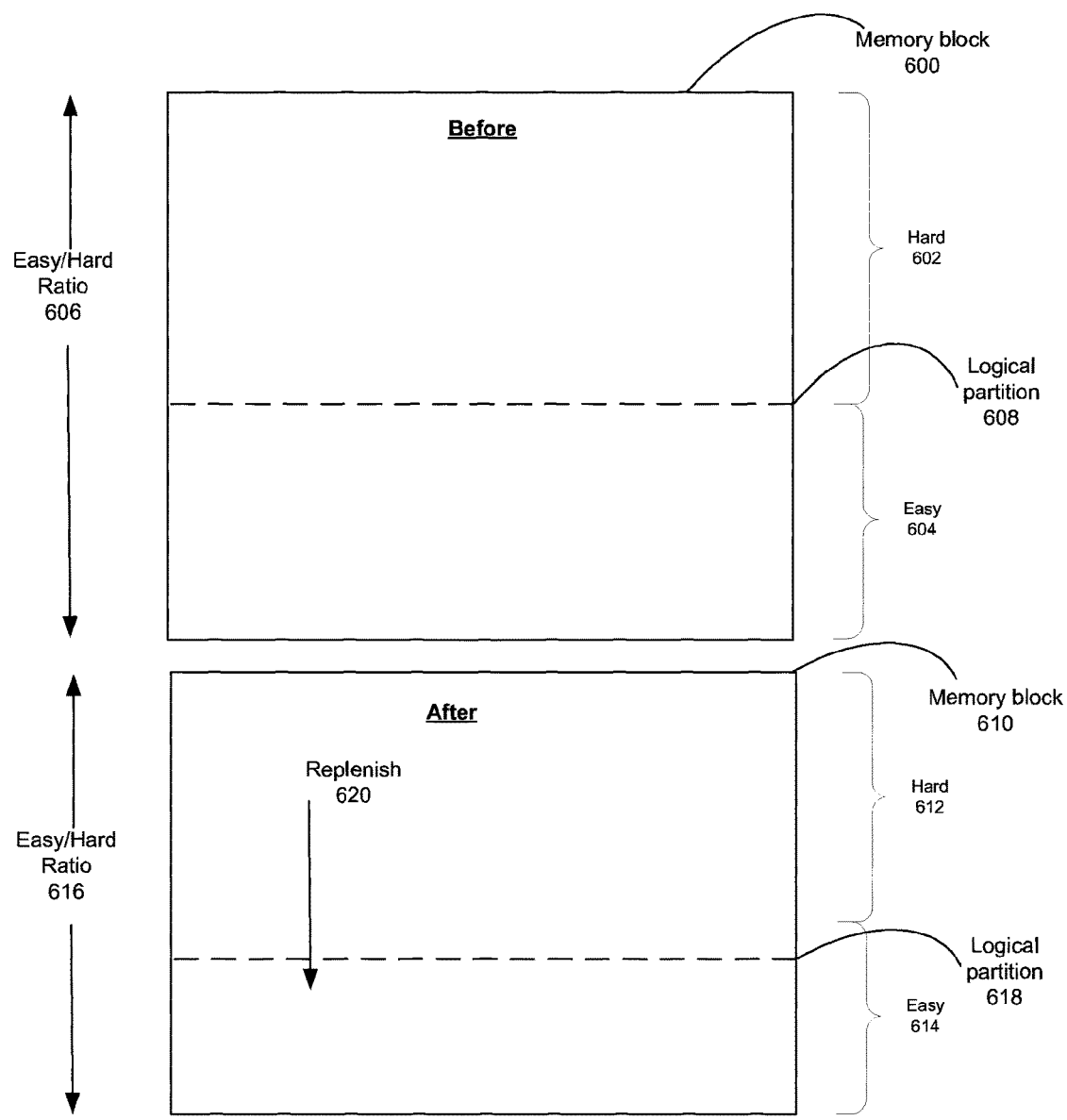
FIG. 6 is a block diagram of a result of a resize operation using a memory management system suitable for operating a dynamic memory tuning program, in accordance with at least one embodiment of the present invention.

FIG. 6 is a block diagram of a result of a resize operating using a memory management system (such as the memory management system 300 in FIG. 3) suitable for operating a dynamic memory tuning program, in accordance with at least one embodiment of the present invention. In the embodiment depicted in FIG. 6, memory block 602 represents an allocation of memory to a memory consumer managed by memory management system 300 and tuner 302 of FIG. 3 before the resize operation occurs. Tuner 302 initiates a request to free memory to the memory consumer having memory block 600 allocated to it. Logical partition 608 represents the separation of hard portion 602 from easy portion 604. Memory block 600 is an example of memory block 500 of FIG. 5.

In the embodiment depicted in FIG. 6, in response to receiving the request from tuner 302 to free memory, the memory consumer frees blocks from easy portion 614. In an asynchronous manner, the memory consumer replenishes the memory blocks freed from easy portion 614 using blocks obtained from hard portion 612 to maintain easy/hard ration 616. Easy/hard ration 616 is the same as easy/hard ratio 606 in the "before" example. Logical partition 618 represents the separation of hard portion 612 from easy portion 614, which appears in a different location relative to logical partition 608 in memory block 600 but the easy/hard ratio is maintained.

Figure 7:
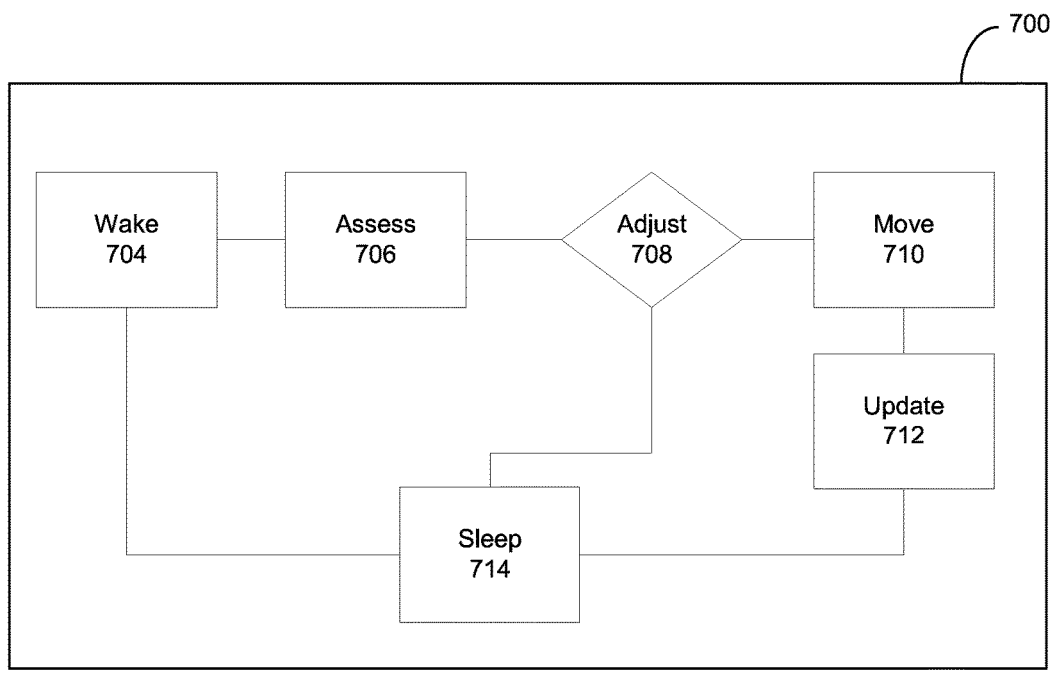
FIG. 7 is a block diagram of a runtime refinement process of a memory management system suitable for operating a dynamic memory tuning program, in accordance with at least one embodiment of the present invention.

FIG. 7 is a block diagram of a runtime refinement process 700 of a memory management system (such as the memory management system 300 in FIG. 3) suitable for operating a dynamic memory tuning program, in accordance with at least one embodiment of the present invention. Runtime refinement process 700 is an example of a runtime refinement process as described with respect to a memory management system (such as the memory management system 300 in FIG. 3) performed using a tuner (such as tuner 302 in FIG. 3). In at least some embodiments, runtime refinement process 700 is a sub-process of tuner operations used to adjust per memory consumer control values and to update the values in a control structure used by tuner when managing memory of one or more memory consumers in a memory management system (such as the memory management system 300 in FIG. 3).

In the runtime refinement process 700 depicted in FIG. 7, phase 704 defines a wake up portion of process 700 in which tuner is directed to enter a wake state to execute a series of operations before reverting to a sleep state, wherein the execution of tuner is paused. Phase 704 represents a phase of process 700 in which tuner gathers information associated with the memory needs of the memory management system taking into consideration activity of the one or more memory consumers. During phase 704 tuner obtains information as described earlier for the per memory consumer control values maintained in the control structure. In phase 708, process 700 performs a determination as to whether to adjust memory allocation. Phase 708 determines whether there is a need to resize memory associated with one or more memory consumers using information obtained during the phase 706. For example, when there is no shortage of memory for new allocations, process 700 determines no need to adjust memory allocation and moves to phase 714 (i.e. a sleep phase), in which execution of the process 700 by tuner is paused.

In the runtime refinement process 700 depicted in FIG. 7, when there is a shortage of memory for new allocations, or memory performance and associated system performance is degraded, process 700 determines a need to adjust and initiates a phase 710. Phase 710 sends one or more requests to selected memory consumers to free memory. The memory consumers free a portion of the respectively allocated memory in accordance with their respective per memory consumer control values maintained in the control structure. In response to the freeing of memory, process 700 updates one or more per memory consumer control values maintained in the control structure for one or more respective memory consumers in a phase 712. Upon completion of a resizing cycle process 700 signals tuner to sleep (in phase 714) until a predetermined time upon which tuner is awakened in wake (in phase 704).

Figure 8:
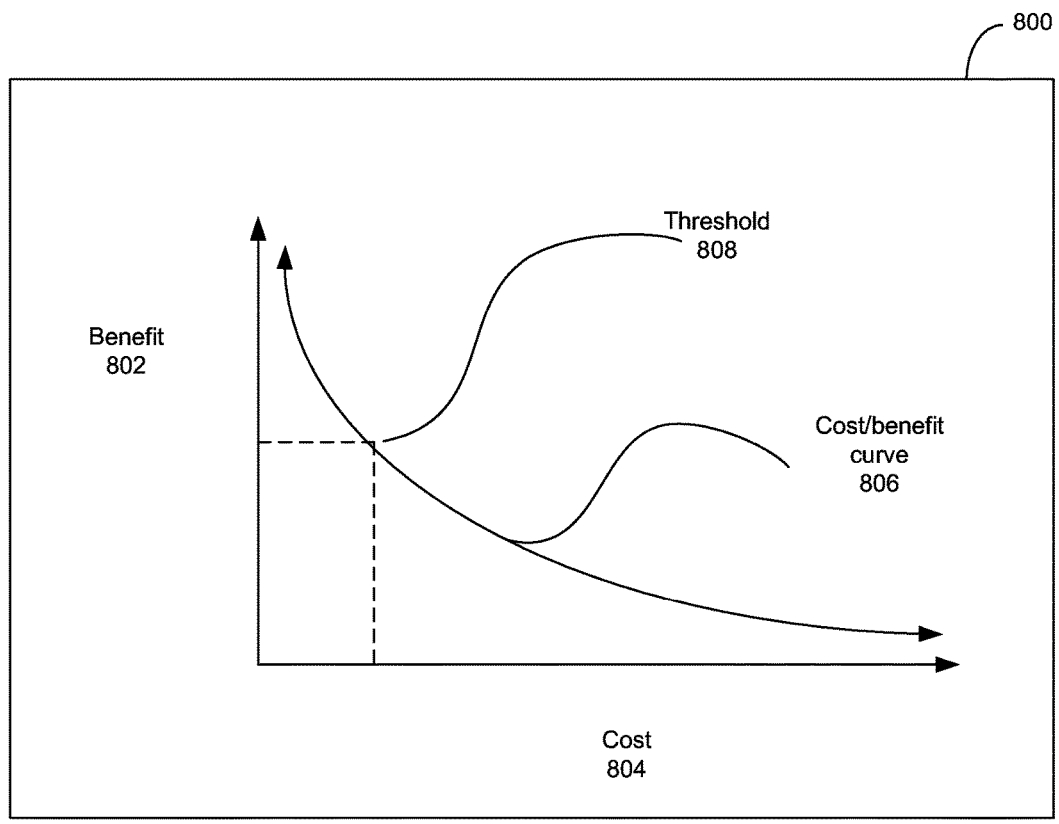
FIG. 8 is a graph representation of a cost benefit analysis performed using a memory management system suitable for operating a dynamic memory tuning program, in accordance with at least one embodiment of the present invention.

FIG. 8 is a graph representation 800 of a cost benefit analysis performed using a memory management system (such as the memory management system 300 in FIG. 3) suitable for operating a dynamic memory tuning program, in accordance with at least one embodiment of the present invention. Graph 800 is an example of graphical representation of a simple cost benefit analysis used by tuner (such as tuner 302 in FIG. 3) in a memory management system (such as memory management system 300 in FIG. 3). A vertical axis 802 depicts a benefit of moving previously allocated memory from one memory consumer to another memory consumer. The benefit increases in an upward direction from the origin of 0 benefit. A horizontal axis 804 depicts a cost of moving the previously allocated memory from the one memory consumer to the other memory consumer. The cost increases in a direction to the right of the origin of 0 cost. A set of points representing a set of corresponding cost benefit pairs of values is plotted to yield cost/benefit curve 806. Cost/benefit curve 806 slopes downward from left to right indicating as costs increase associated benefits decrease. A particular point is identified as threshold 808, which is a point after which no further reclaiming of memory from the respective memory consumer is deemed to be useful due to the associated cost/benefit ratio.

Figure 9:
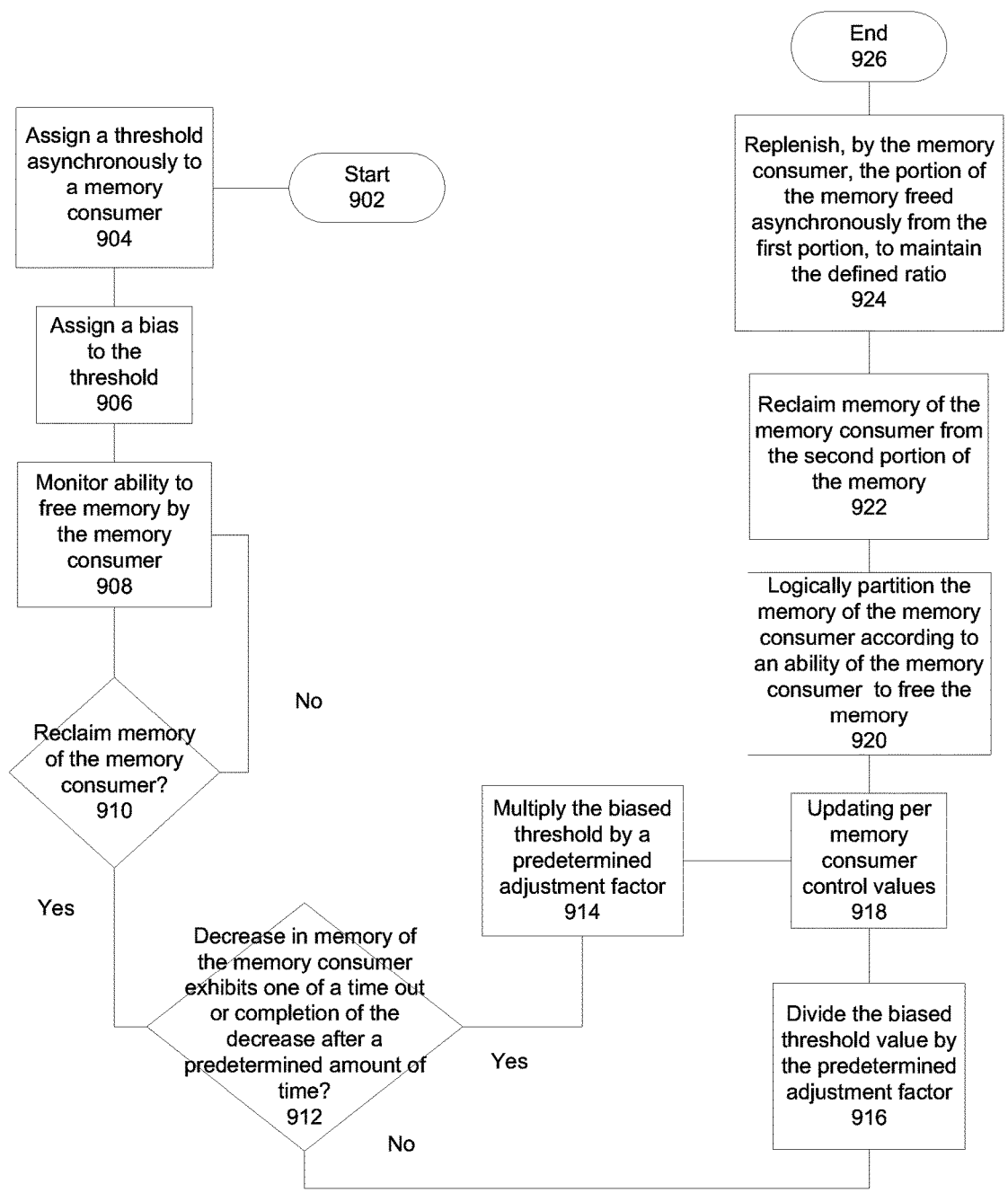
FIG. 9 is a flowchart diagram of a dynamic memory tuning program, in accordance with at least one embodiment of the present invention.

FIG. 9 is a flowchart diagram of a dynamic memory tuning program. In at least some embodiments, the embodiment depicted in FIG. 9 is performed for tuning memory in a presence of asymmetrical memory transfer costs using a memory management system (such as the memory management system 300 in FIG. 3) suitable for operation of a dynamic memory management program. In the embodiment depicted in FIG. 9, the program begins at step 902 and assigns a threshold value asynchronously to a memory consumer according to a respective ability of the particular memory consumer to free memory at step 904. In some embodiments, the threshold is defined as a value of benefit below which no memory growth will occur. In some embodiments, the threshold value is then biased according to an overall ability of the memory consumer to free memory. Some memory consumers are historically viewed as having difficulty when freeing memory, for example, buffer pools; while other memory consumers are able to free memory more easily and reliably. In some embodiments, memory consumers known to have difficulty when freeing memory have their threshold value increased. In some embodiments, the threshold value may be calculated as benefit threshold value, which may also be accompanied by a cost threshold value. In at least some embodiments, the cost and benefit are not symmetric. In some embodiments, when used as a benefit threshold, a cost to the consumer to lose memory, as well as a cost to reclaim that memory, is factored into the calculation.

Automated memory tuning moves memory to consumers most in need, from consumers that are less in need. However memory tuning is typically not asymmetrical in nature. In some cases, memory can be given to a consumer "inexpensively" in comparison to reclaiming the same memory from a consumer, which is typically expensive. For example, buffer pools may have to write pages to disk before the associated memory can be freed. Further, latching of portions of memory can also delay a reclaim operation.

The problem may be mitigated by breaking up large memory resize operations into smaller operations. A change in memory resize operations does not always lead to a resize that completes within a predetermined time; however, a memory tuner is able to observe the time required for a small resize, and then estimate whether a larger resize will succeed in a predetermined amount of time.

In some embodiments of the present invention, an element is used to bias memory tuning decisions using an ability to free memory for each memory consumer. For example, when a memory consumer is unable to free memory quickly, it is less likely that memory consumer will be given memory under certain circumstances. Conversely, when a memory consumer is able to free memory quickly, that memory consumer will be given memory more liberally.

In the embodiment depicted in FIG. 9, the dynamic memory tuning program further assigns a bias value to the threshold at step 906. In some embodiments, the bias is set to a first value (e.g. 1) when the memory consumer is known to free memory easily and set to a second value (e.g. 2) when the memory consumer is known to be unable to free up memory within a reasonable amount of time. In at least some of those embodiments, the first value is less than the second value, indicating a preference toward a memory consumer capable of freeing memory easily (within predetermined constraints of costs, typically defined in units of time). In at least some embodiments, the program divides the memory used by a memory consumer, dedicating a percentage of the respective memory to store data that is easily freed (e.g. when a cost of adding memory to the memory consumer is approximately the same as the cost of taking memory away from that memory consumer).

In some embodiments, the dynamic memory tuning program incorporates one or more other mechanisms for dealing with the problem of asynchronous memory consumers. In at least some embodiments, memory managers typically do not continually allocate memory to a memory consumer until an associated benefit reaches 0. In at least some of those embodiments, his is because as the benefit decreases, a threshold is typically crossed in which a cost of a simple act of moving memory offsets a nominal benefit a given consumer obtains for obtaining the memory. Additionally, in at least some of those embodiments, cost-benefit data can be a mixture of useful data and not useful data described as noise. For example, the noise may be due to collecting minimal data associated with a movement of memory during a reclamation operation associated with little benefit. As a result, determining whether a metric observed represents an actual benefit or the metric represents detected noise may be difficult. To resolve this problem of collecting useful information rather than noise, memory managers typically employ a threshold, below which no memory tuning occurs. In at least some embodiments, to solve a problem associated with an asynchronous memory consumer, a respective threshold value is assigned asynchronously to each memory consumer according to a respective ability of the respective memory consumer to free previously allocated memory. For example, when a memory consumer is able to free memory immediately (therefore with 0 cost), a bias to the tuning threshold is assigned a value of 1. In contrast, when the memory consumer is known to be unable to free memory within a predetermined time (therefore with a high cost), that memory consumer is assigned a value of 2 for the bias, doubling the threshold at which memory will no longer be assigned to the consumer. In at least some embodiments, using a reasonable amount of testing and analysis, appropriate bias values are assigned to all memory consumers according to a respective historical ability to free memory.

In some embodiments, assigning the threshold value asynchronously, by a memory tuner, to the memory consumer further comprises one of assigning the threshold value as a cost threshold, wherein the cost includes a cost to a memory consumer to lose memory and a cost to reclaim memory; and assigning the threshold value as a benefit threshold. Therefore, in some embodiments, the threshold may represent in one situation a cost threshold and in another situation a benefit threshold.

In the embodiment depicted in FIG. 9, the dynamic memory tuning program monitors an ability to free memory by the memory consumer at step 908. In some embodiments, during the aforementioned monitoring of the memory consumer, statistics associated with the freeing of memory are gathered, analyzed and stored in a control structure for subsequent use. The information as described earlier is for the per memory consumer control values maintained in the control structure. The information gathered may be used to provide an initial population of the control structure for at least one of other memory consumers (if any) or may be used to supplement previously stored information in the control structure for at least one of other memory consumers (if any).

In some embodiments, as a system runs, an ability of a given memory consumer to free memory is monitored by a tuning component of the memory manager. In some embodiments, in situations when a memory consumer times out, or completes a resize only after taking a longer than a predetermined time (e.g. 2 seconds), the tuning component multiplies a current bias of the memory consumer by a predetermined factor, for example, 2, up to a predetermined limit of an upper bound. Similarly, when a memory consumer is able to free memory quickly, the tuning component divides the current bias value of the memory consumer by another predetermined factor, in this example also 2, (but the two predetermined values may not necessarily be the same value) down to another predetermined limit of a lower bound. This runtime adjustment accordingly encapsulates system-to-system variability using the threshold values.

In the embodiment depicted in FIG. 9, the dynamic memory tuning program determines whether to reclaim memory of the memory consumer at step 910. In some embodiments, the determination is made on the basis of whether the memory management system perceives a need to allocate memory, yet free memory with which to perform the allocation does not appear to be readily available. In the embodiment depicted in FIG. 9, in response to an absence of the need to reclaim memory, the program reverts back to step 908 and monitors as before.

In at least some embodiments, runtime refinement of a threshold value using a bias value enables a memory manager to adjust the threshold value for a memory consumer. As the system runs, the bias value is modified using observations of resize times. When resize times are large, the bias value is increased. A memory consumer with an increased bias value will therefore has to be in greater need before memory tuning occurs. In some of those embodiments, a further change is made to require memory consumers to continually hold a predetermined percentage of respective assigned memory (e.g. 20 percent) in an easily freed state. In the buffer pool example, such pages would be cleaned and not pinned.

In the embodiment depicted in FIG. 9, in response to a need to reclaim memory, the dynamic memory tuning program determines whether reclaiming of memory of the memory consumer, by the memory consumer, exhibits one of a time out or a completion of the reclaim after a predetermined amount of time (e.g. 3 seconds) at step 912. In response to a positive response in step 912, the program multiplies the biased threshold value by a predetermined adjustment factor (e.g. an adjustment factor of 2). The adjusting may not always multiply by the predetermined adjustment factor every time a reclaim occurs. In some embodiments, the program adds a deadening amount to the multiplication so that after a predetermined time, multiplication by a smaller amount, or by 1 (i.e. with no net effect) is performed. In at least some embodiments, the deadening fact is a temporal change of the adjustment factor and avoids a temporary change in the control table. In response to a negative response in step 912, wherein the memory consumer frees memory in less than the predetermined amount of time, the program divides (or multiplies by a fractional amount dependent upon how the adjustment factor is maintained) the biased threshold value by the predetermined adjustment factor at step 916. The program updates the per memory consumer control values maintained in the control structure at step 918.

In the embodiment depicted in FIG. 9, the dynamic memory tuning program logically partitions the memory of the memory consumer according to an ability of the memory consumer to free the memory at step 920. In at least some embodiments, the logically partitioning occurs according to a ratio (a value maintained in the control structure or calculated dynamically at runtime) that divides the allocated memory used by the memory consumer into at least a first portion and a second portion. The first portion is defined as the set of memory blocks that are hard to free relative the second portion which is defined as the set of memory blocks that are easy to free relative the first portion. In some embodiments, a third portion is defined as a set of memory block for which a time to be freed is unknown. In at least some embodiments, the sum of the first portion, the second portion and the third portion is the total memory allocation for the respective memory consumer.

In some embodiments, dividing allocated memory of the memory consumer according to an ability to free the memory of the memory consumer enables a memory manager to more easily free memory of the particular memory consumer. In some embodiments, using a defined ratio (predefined maintained in the control table or calculated at run time), memory used by a memory consumer is divided into one portion, which is deemed harder and slower to free, and another portion that is deemed to be easier to free. Then, when a memory tuner makes a decision to take memory from the memory consumer, that memory can be freed immediately from the portion of memory that is easy to free. In at least some of those embodiments, the memory consumer then asynchronously replenishes the easy to free portion from the harder and slower to free portion, to maintain the same defined ratio, and be ready for a next resize.

In response to a decision to reclaim memory from the memory consumer made in step 910, the dynamic memory tuning program directs the respective memory consumer to reclaim memory from the second portion of the memory associated with the respective memory consumer at step 922. In some embodiments, the second portion of the respective memory consumer is the set of memory blocks that are easy to free relative the first portion and accordingly provide most benefit-to-cost ratio. In some embodiments, the program directs the respective memory consumer to replenish the portion of the memory, freed by the memory consumer, asynchronously from the first portion. In at least some embodiments, replenishing as described enables the memory consumer to maintain the defined ratio as indicated in the logical partitioning and be ready for a next resize operation. For example, a buffer manager managing a buffer pool used in a relational database could divide the memory in read-write memory, that is likely harder to free, and read-only memory, that is easier to free. In at least some embodiments, when the read-only memory has been freed, some of the read-write memory pages can be written to disk and once cleaned, those pages can be either moved to the read-only portion or the memory can be freed and the same amount of pages allocated in the read-only portion.

Thus is presented in an illustrative embodiment an apparatus for tuning memory in presence of asymmetrical memory transfer costs, in accordance with at least one embodiment of the present invention. The apparatus comprising a communications fabric; a memory connected to the communications fabric, wherein the memory contains computer executable program code; a communications unit connected to the communications fabric; an input/output unit connected to the communications fabric; a display connected to the communications fabric; and a processor unit connected to the communications fabric. In at least some embodiments, the processor unit executes the computer executable program code to direct the apparatus to assign a threshold value asynchronously, by a memory tuner, to a memory consumer; assign a bias value to the threshold, by the memory tuner; and monitor, by the memory tuner, an ability to free memory by the consumer.

In at least some embodiments, the processor unit executes the computer executable program code to further direct the apparatus to determine, by the memory tuner, whether to reclaim memory of the memory consumer. In at least some embodiments, the processor unit executes the computer executable program code to further direct the apparatus to, in response to a determination to reclaim memory of the memory consumer, direct, by the memory tuner, the memory consumer to reclaim the memory, and wherein the memory consumer exhibits one of a time out or a completion of the reclaim after a predetermined amount of time, multiply, by the memory tuner, the biased threshold value by a predetermined adjustment factor. In at least some embodiments, the processor unit executes the computer executable program code to further direct the apparatus to, in response to a determination to reclaim memory of the memory consumer, direct, by the memory tuner, the memory consumer to reclaim the memory, and wherein the memory consumer frees memory in less than the predetermined amount of time, divide, by the memory tuner, the biased threshold value by the predetermined adjustment factor.

In at least some embodiments, the processor unit executes the computer executable program code to further direct the apparatus to update per memory consumer control values, by the memory tuner; and to logically partition the memory of the memory consumer, by the memory tuner, according to an ability of the memory consumer to free the memory, wherein the logically partitioning occurs according to a defined ratio that divides the memory used by the memory consumer into at least a first portion and a second portion.

In at least some embodiments, the processor unit executes the computer executable program code to further direct the apparatus to, in response to directing, by the memory tuner, to reclaim memory from the memory consumer, direct the memory consumer to reclaim memory from the second portion and, in response to reclaiming memory from the second portion, direct the memory consumer to replenish the second portion of the memory freed by the memory consumer asynchronously from the first portion, to maintain the defined ratio.

In at least some embodiments, the dynamic memory tuning program assigns a threshold value asynchronously, by a memory tuner, to a memory consumer. In at least some embodiments, the program further assigns a bias value to the threshold value, by the memory tuner (e.g. in a manner that may transform and/or change the threshold value). In at least some embodiments, the program further monitors, by the memory tuner, an ability to free memory by the memory consumer. In at least some embodiments, the program further determines, by the memory tuner, whether to reclaim memory of the memory consumer. In at least some embodiments, in response to a determination to reclaim memory of the memory consumer, the program directs, by the memory tuner, the memory consumer to reclaim the memory of the memory consumer.

In at least some embodiments, the program further determines whether, when reclaiming the memory of the memory consumer, the memory consumer exhibits at least one of a time out or a completion of the reclaim after a first predetermined amount of time (e.g. 1 second). In at least some embodiments, in response to a determination that, when reclaiming the memory of the memory consumer, the memory consumer exhibits at least one of a time out or a completion of the reclaim after the first predetermined amount of time, the program transforms (i.e. divides or multiplies), by the memory tuner, the threshold value (e.g. the biased threshold value) by a first predetermined adjustment factor (e.g. a first predetermined adjustment factor of 2, which may be determined statistically or dynamically at runtime). In at least some embodiments, in response to a determination that, when reclaiming the memory of the memory consumer, the memory consumer does not exhibit at least one of a time out or a completion of the reclaim after the first predetermined amount of time, the program transforms (i.e. divides or multiplies), by the memory tuner, the threshold (e.g. the biased threshold value) value by a second predetermined adjustment factor (where the second predetermined adjustment factor may, but need not, be equal to the first predetermined adjustment factor, and where the second adjustment factor may be determined statistically or dynamically at runtime). In at least some embodiments, the program further updates per memory consumer control values, by the memory tuner.

In at least some embodiments, the program further logically partitions the memory of the memory consumer, by the memory tuner, according to both an ability of the memory consumer to free the memory and a defined ratio (e.g. a ration that gives the first portion 40 percent of the memory of the memory consumer and gives the second portion 60 percent of the memory of the memory consumer) that divides the memory used by the memory consumer into at least a first portion and a second portion. In at least some embodiments, subsequent to directing, by the memory tuner, the memory consumer to reclaim the memory of the memory consumer, the program reclaims, by the memory consumer, memory from the second portion. In at least some embodiments, subsequent to reclaiming, by the memory consumer, memory from the second portion, the program replenishes, by the memory consumer, the second portion of the memory freed by the memory consumer asynchronously from the first portion in a manner that maintains the defined ratio.

In some embodiments, the threshold value is assigned according to a respective ability of the memory consumer to free memory. In some embodiments, assigning the bias value to the threshold value, by the memory tuner, further comprises setting the bias value to a first value when the memory consumer is known to be able to free memory within (i.e. in a time period less than or equal to) a second predetermined amount of time (where the second predetermined amount of time may, but need not, be equal to the first predetermined amount of time) and setting the bias value to a second value when the memory consumer is known to be unable to free memory within the second predetermined amount of time, wherein the second value is greater than or equal to the first value (i.e. the first value is less than the second value). In some embodiments, the defined ratio is based on a predetermined value and a dynamically determined value, wherein the dynamically determined value is dynamically calculated at run time.

In some embodiments, the memory of the memory consumer consists of the first portion, the second portion, and a third portion; the first portion comprises a set of memory blocks known to be unable to be freed within a third predetermined amount of time (where the third predetermined amount of time may, but need not, be equal to the first predetermined amount of time and/or the second predetermined amount of time), the second portion comprises a set of memory blocks known to be able to be freed within the third predetermined amount of time; and the third portion comprises a set of memory blocks for which a time to be freed is unknown. In at least some of those embodiments, the sum of the first portion, the second portion, and the third portion is a total memory allocation for the respective memory consumer. In some embodiments, the memory of the memory consumer consists of the first portion and the second portion; in some of those embodiments, the first portion comprises a set of memory blocks known to be unable to be freed within a fourth predetermined amount of time (where the fourth predetermined amount of time may, but need not, be equal to the first predetermined amount of time, the second predetermined amount of time, and/or the third predetermined amount of time); and the second portion comprises a set of memory blocks known to be able to be freed within the fourth predetermined amount of time. In at least some of those embodiments, the sum of the first portion and the second portion is a total memory allocation for the respective memory consumer.

In some embodiments, updating per memory consumer control values, by the memory tuner, further comprises adjusting, by the memory tuner and during runtime, the bias value associated with a benefit threshold value using one or more observations of resize times associated with one or more memory consumers. In some embodiments, the threshold value is assigned as a utility threshold value selected from the group consisting of: (i) a cost threshold value determined based on a cost to the memory consumer to lose memory and a cost to reclaim memory; and (ii) a benefit threshold value. In some embodiments, the benefit threshold value is a value below which no memory growth will occur.

In at least some embodiments, the dynamic memory tuning program determines whether the memory tuner directs the memory consumer to reclaim the memory of the memory consumer. In response to directing, by the memory tuner, the memory consumer to reclaim the memory of the memory consumer, the program reclaims, by the memory consumer, memory from the second portion; and subsequent to reclaiming, by the memory consumer, memory from the second portion, the program replenishes, by the memory consumer, the second portion of the memory freed by the memory consumer asynchronously from the first portion in a manner that maintains the defined ratio.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, and DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method for tuning memory in presence of asymmetrical memory transfer costs comprising:
    assigning a threshold value asynchronously, by a memory tuner, to a memory consumer;
    assigning a bias value to the threshold value, by the memory tuner;
    monitoring, by the memory tuner, an ability to free memory by the memory consumer;
    determining, by the memory tuner, whether to reclaim memory of the memory consumer;
    in response to a determination to reclaim memory of the memory consumer, directing, by the memory tuner, the memory consumer to reclaim the memory of the memory consumer;
    determining whether, when reclaiming the memory of the memory consumer, the memory consumer exhibits at least one of a time out or a completion of the reclaim after a first predetermined amount of time;
    in response to a determination that, when reclaiming the memory of the memory consumer, the memory consumer exhibits at least one of a time out or a completion of the reclaim after the first predetermined amount of time:
        transforming, by the memory tuner, the threshold value by a first predetermined adjustment factor;
    in response to a determination that, when reclaiming the memory of the memory consumer, the memory consumer does not exhibit at least one of a time out or a completion of the reclaim after the first predetermined amount of time:
        transforming, by the memory tuner, the threshold value by a second predetermined adjustment factor;
    updating per memory consumer control values, by the memory tuner;
    logically partitioning the memory of the memory consumer, by the memory tuner, according to both an ability of the memory consumer to free the memory and a defined ratio that divides the memory used by the memory consumer into at least a first portion and a second portion;
    subsequent to directing, by the memory tuner, the memory consumer to reclaim the memory of the memory consumer, reclaiming, by the memory consumer, memory from the second portion; and
    subsequent to reclaiming, by the memory consumer, memory from the second portion, replenishing, by the memory consumer, the second portion of the memory freed by the memory consumer asynchronously from the first portion in a manner that maintains the defined ratio.

2. The computer-implemented method of claim 1, wherein said threshold value is assigned according to a respective ability of the memory consumer to free memory.

3. The computer-implemented method of claim 1 wherein the assigning the bias value to the threshold value, by the memory tuner, further comprises:
    setting the bias value to a first value when the memory consumer is known to be able to free memory within a second predetermined amount of time; and
    setting the bias value to a second value when the memory consumer is known to be unable to free memory within the second predetermined amount of time, the second value being greater than or equal to the first value.

4. The computer-implemented method of claim 1, wherein the defined ratio is based on a predetermined value and a dynamically determined value, the dynamically determined value being dynamically calculated at run time.

5. The computer-implemented method of claim 4, wherein:
    the memory of the memory consumer consists of the first portion, the second portion, and a third portion;
    the first portion comprises a set of memory blocks known to be unable to be freed within a third predetermined amount of time;
    the second portion comprises a set of memory blocks known to be able to be freed within the third predetermined amount of time; and
    the third portion comprises a set of memory blocks for which a time to be freed is unknown.

6. The computer-implemented method of claim 1 wherein updating per memory consumer control values, by the memory tuner, further comprises:
    adjusting, by the memory tuner and during runtime, the bias value associated with a benefit threshold value using one or more observations of resize times associated with one or more memory consumers.

7. The computer-implemented method of claim 1, wherein the threshold value is assigned as a utility threshold value, the utility threshold value selected from the group consisting of:

a cost threshold value, the cost threshold value determined based on a cost to the memory consumer to lose memory and a cost to reclaim memory; and
a benefit threshold value.

8. A computer program product comprising one or more computer readable storage media and program instructions stored on said one or more computer readable storage media, said program instructions comprising instructions to:
assign a threshold value asynchronously, by a memory tuner, to a memory consumer;
assign a bias value to the threshold value, by the memory tuner;
monitor, by the memory tuner, an ability to free memory by the memory consumer;
determine, by the memory tuner, whether to reclaim memory of the memory consumer;
in response to a determination to reclaim memory of the memory consumer, direct, by the memory tuner, the memory consumer to reclaim the memory of the memory consumer;
determine whether, when reclaiming the memory of the memory consumer, the memory consumer exhibits at least one of a time out or a completion of the reclaim after a first predetermined amount of time;
in response to a determination that, when reclaiming the memory of the memory consumer, the memory consumer exhibits at least one of a time out or a completion of the reclaim after the first predetermined amount of time:
transform, by the memory tuner, the threshold value by a first predetermined adjustment factor;
in response to a determination that, when reclaiming the memory of the memory consumer, the memory consumer does not exhibit at least one of a time out or a completion of the reclaim after the first predetermined amount of time:
transform, by the memory tuner, the threshold value by a second predetermined adjustment factor;
update per memory consumer control values, by the memory tuner;
logically partition the memory of the memory consumer, by the memory tuner, according to both an ability of the memory consumer to free the memory and a defined ratio that divides the memory used by the memory consumer into at least a first portion and a second portion;
subsequent to directing, by the memory tuner, the memory consumer to reclaim the memory of the memory consumer, reclaim, by the memory consumer, memory from the second portion; and
subsequent to reclaiming, by the memory consumer, memory from the second portion, replenish, by the memory consumer, the second portion of the memory freed by the memory consumer asynchronously from the first portion in a manner that maintains the defined ratio.

9. The computer program product of claim 8, wherein said threshold value is assigned according to a respective ability of the memory consumer to free memory.

10. The computer program product of claim 8, wherein said instructions to assign the bias value to the threshold value, by the memory tuner, further comprises instructions to:
set the bias value to a first value when the memory consumer is known to be able to free memory within a second predetermined amount of time; and
set the bias value to a second value when the memory consumer is known to be unable to free memory within the second predetermined amount of time, the second value being greater than or equal to the first value.

11. The computer program product of claim 8, wherein the defined ratio is based on a predetermined value and a dynamically determined value, the dynamically determined value being dynamically calculated at run time.

12. The computer program product of claim 11, wherein:
the memory of the memory consumer consists of the first portion, the second portion, and a third portion;
the first portion comprises a set of memory blocks known to be unable to be freed within a third predetermined amount of time;
the second portion comprises a set of memory blocks known to be able to be freed within the third predetermined amount of time; and
the third portion comprises a set of memory blocks for which a time to be freed is unknown.

13. The computer program product of claim 8, wherein said instructions to update per memory consumer control values, by the memory tuner, further comprise instructions to:
adjust, by the memory tuner and during runtime, the bias value associated with a benefit threshold value using one or more observations of resize times associated with one or more memory consumers.

14. The computer program product of claim 8, wherein the threshold value is assigned as a utility threshold value, the utility threshold value selected from the group consisting of:
a cost threshold value, the cost threshold value determined based on a cost to the memory consumer to lose memory and a cost to reclaim memory; and
a benefit threshold value.

15. A computer system comprising:
a processor;
one or more computer readable storage media;
computer program instructions;
said computer program instructions being stored on said one or more computer readable storage media; and
said computer program instructions comprising instructions to:
assign a threshold value asynchronously, by a memory tuner, to a memory consumer;
assign a bias value to the threshold value, by the memory tuner;
monitor, by the memory tuner, an ability to free memory by the memory consumer;
determine, by the memory tuner, whether to reclaim memory of the memory consumer;
in response to a determination to reclaim memory of the memory consumer, direct, by the memory tuner, the memory consumer to reclaim the memory of the memory consumer;
determine whether, when reclaiming the memory of the memory consumer, the memory consumer exhibits at least one of a time out or a completion of the reclaim after a first predetermined amount of time;
in response to a determination that, when reclaiming the memory of the memory consumer, the memory consumer exhibits at least one of a time out or a completion of the reclaim after the first predetermined amount of time:
transform, by the memory tuner, the threshold value by a first predetermined adjustment factor;

in response to a determination that, when reclaiming the memory of the memory consumer, the memory consumer does not exhibit at least one of a time out or a completion of the reclaim after the first predetermined amount of time:
  transform, by the memory tuner, the threshold value by a second predetermined adjustment factor;
update per memory consumer control values, by the memory tuner;
logically partition the memory of the memory consumer, by the memory tuner, according to both an ability of the memory consumer to free the memory and a defined ratio that divides the memory used by the memory consumer into at least a first portion and a second portion;
subsequent to directing, by the memory tuner, the memory consumer to reclaim the memory of the memory consumer, reclaim, by the memory consumer, memory from the second portion; and
subsequent to reclaiming, by the memory consumer, memory from the second portion, replenish, by the memory consumer, the second portion of the memory freed by the memory consumer asynchronously from the first portion in a manner that maintains the defined ratio.

16. The computer system of claim 15, wherein said threshold value is assigned according to a respective ability of the memory consumer to free memory.

17. The computer system of claim 15, wherein said instructions to assign the bias value to the threshold value, by the memory tuner, further comprises instructions to:
  set the bias value to a first value when the memory consumer is known to be able to free memory within a second predetermined amount of time; and
  set the bias value to a second value when the memory consumer is known to be unable to free memory within the second predetermined amount of time, the second value being greater than or equal to the first value.

18. The computer system of claim 15, wherein the defined ratio is based on a predetermined value and a dynamically determined value, the dynamically determined value being dynamically calculated at run time.

19. The computer system of claim 18, wherein:
  the memory of the memory consumer consists of the first portion, the second portion, and a third portion;
  the first portion comprises a set of memory blocks known to be unable to be freed within a third predetermined amount of time;
  the second portion comprises a set of memory blocks known to be able to be freed within the third predetermined amount of time; and
  the third portion comprises a set of memory blocks for which a time to be freed is unknown.

20. The computer system of claim 15, wherein the threshold value is assigned as a utility threshold value, the utility threshold value selected from the group consisting of:
  a cost threshold value, the cost threshold value determined based on a cost to a memory consumer to lose memory and a cost to reclaim memory; and
  a benefit threshold value.

* * * * *